United States Patent Office 3,562,292
Patented Feb. 9, 1971

---

3,562,292
N-SUBSTITUTED PHTHALIMIDES
Ferdinand Grewe, Burscheid, Gerhard Schrader, Wuppertal-Cronenberg, Helmut Kaspers, Leverkusen, and Werner Meiser, Wuppertal-Elberfeld, Germany, assignors to Farbenfabriken Bayer Aktiengesellschaft, Leverkusen, Germany, a corporation of Germany
No Drawing. Filed May 25, 1967, Ser. No. 641,125
Claims priority, application Germany, May 31, 1966,
F 49,345
Int. Cl. C07d 27/52
U.S. Cl. 260—326                                 5 Claims

ABSTRACT OF THE DISCLOSURE

N-[unsubstituted- and (halo, lower alkyl, lower alkoxy, lower alkylmercapto and/or hydroxy) substituted-aromatic, cycloaliphatic and aliphatic] phthalimides which possess fungicidal properties and which may be prepared by conventional procedures.

---

The present invention relates to and has for its objects the provision for particular new N-substituted phthalimides, and especially N-[unsubstituted- and (halo, lower alkyl, lower alkoxy, lower alkylmercapto and/or hydroxy) substituted- aromatic, cycloaliphatic and aliphatic] phthalimides, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known to use certain N-substituted phthalimides as fungicidal active compounds. In particular, N-trichlormethylthiophthalimide (A) has in practice attained a considerable importance as an active compound for the control of phytopathogenic fungi.

It has now been found, in accordance with the present invention, that the particular new N-substituted phthalimides, and especially N-[unsubstituted- and (halo, lower alkyl, lower alkoxy, lower alkylmercapto and/or hydroxy) substituted-aromatic, cycloaliphatic and aliphatic] pthalimides, of the general formula

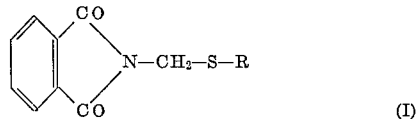

in which R is selected from the group consisting of aromatic having 6–10 ring carbon atoms, cycloaliphatic having 5–8 ring carbon atoms, lower aliphatic, and such aromatic, cycloaliphatic and aliphatic which is substituted with at least one substituent selected from the group consisting of halo, lower alkyl, lower alkoxy, lower alkylmercapto, hydroxy, and mixtures of such substituents, possess markedly strong fungicidal properties.

It has been furthermore found, in accordance with the present invention, that a versatile and smooth process for the production of the particular new N-substituted phthalimide of general Formula I in favorable yields may be provided, which comprises reacting a N-halomethylphthalimide of the formula

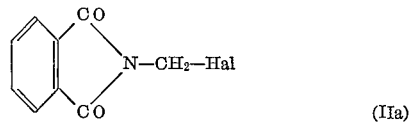

in which Hal represents a halogen atom, such as chloro, bromo, iodo or fluoro, especially chloro and bromo, with a mercapto compound of the formula $$X\text{—}S\text{—}R \qquad \text{(IIb)}$$

in which R is the same as defined above, and X represents hydrogen or an equivalent of a metal such as an alkali metal atom, e.g. sodium or potassium.

The reaction in accordance with the production process of the instant invention may be carried out in the presence of an acid binding agent, and it may be carried out in the presence of a solvent, if desired.

Surprisingly, the particular new phthalimides of the present invention exhibit a considerably higher fungicidal activity than the chemically closest N-substituted phthalimides having fungicidal activity which are known from the prior art.

The course of the instant reaction can be illustrated by the following scheme:

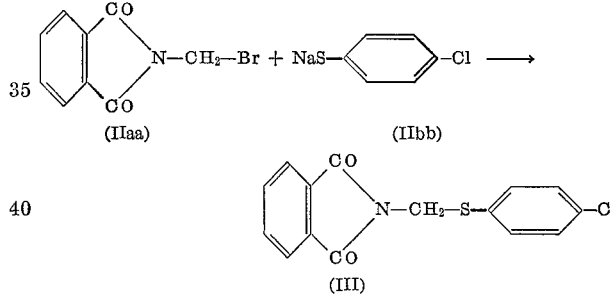

The required reactants are already known from the literature.

The mercapto compounds may be used advantageously not only in free form but also in the form of their salts. In the main, the alkali metal salts, such as the sodium or potassium salt, are suitable. It is also possible first to form the salts in the reaction mixture.

As diluents, all inert organic solvents are suitable, in particular those which have a high dipole moment. As illustrative examples, acetonitrile, dimethyl formamide, dioxan, and the like, may be mentioned.

When the free mercapto compounds are used, it is expedient to add an acid-binding agent. For this purpose, the usual acid binders are suitable, such as alkali metal carbonates, for example potassium carbonate or sodium carbonate, or tertiary amines, for example triethylamine or pyridine, or the like.

It is also possible to work in anhydrous medium and to add alkali metal alcoholates, in particular sodium methylate or sodium ethylate, or the like.

The instant reaction temperatures may be varied within a fairly wide range. In general, the reaction is carried out at substantially between about 0 to 80° C., preferably between about 10 to 60° C.

When carrying out the reaction in accordance with the present invention, approximately equimolar amounts of the starting substances and of the acid binder (if any) may be used. The reaction mixture can be worked up for example by pouring it into water, washing the reaction product out with an organic solvent and evaporating in a vacuum the solution which is obtained.

Advantageously, the particular new active compounds of the present invention exhibit a strong fungitoxic activity and are suitable specifically for the control of phytopathogenic fungi, preferably for control of fungi which are the cause of genuine powdery mildew diseases.

Surprisingly, the instant phthalimides possess an extremely low phytotoxicity and concomitantly an extremely low toxicity with respect to mammals. Thus, it is for example possible to apply to the leaves of the plants as well as to blossoms a multiple of the amount of the particular new active compound necessary for the control of phytopathogenic fungi without any damage occurring to the plants.

The instant phthalimides are particularly effective against genuine powdery mildew fungi. They are for example suitable for the control of powdery mildew of apples (*Podosphaera leucotricha*), powdery mildew of roses (*Sphaerotheca pannosa*), powdery mildew of cucumbers (*Erysiphe cichoracearum*), and the like.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powder, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, etc., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, such as other fungicides which exhibit a particularly good activity against non-mildew fungi, acaricides, and/or insecticides, if desired.

The substances according to the invention may be employed by themselves as the artisan will appreciate, in the form of their compositions with solid or liquid dispersible carrier vehicles or other known compatible active agents such as other fungicides and insecticides, acaricides, nematicides, fertilizers, and soil structure improving agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005 and 5.0% by weight, and preferably 0.001 and 1% by weight, of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.0005 and 95% by weight, and preferably 0.001 and 90% by weight, of the mixture.

Furthermore, the present invention contemplates methods of selectively controlling and combating fungi, which comprise applying to at least one of (a) such fungi and (b) their fungous habitat a fungicidally effective amount of the particular compound of the invention alone or together with a carrier vehicle as noted above. The instant formulations or compositions are applied in the usual manner, for example, by spraying, atomizing, vaporizing, scattering, dusting, watering, sprinkling, pouring and the like, for example to plants, seeds or soil.

In particular, the concentration of the active compound of the invention which is utilized with the carrier vehicle will depend upon the intended application, as the artisan will appreciate. Thus, in special cases, it is possible to go above or to go below the above-mentioned range of concentration.

The following examples are given for the purpose of illustrating, while not limiting, the fungicidal utility of the particular new compounds acccording to the present invention:

EXAMPLE 1

Podosphaera test (powdery mildew of apples)/Protective

Solvent: 4.7 parts of weight acetone
Emulsifier: 0.3 part by weight alkylaryl polygylcol ether
Water: 95 parts by weight.

The amount of the particular active compound required for the desired concentration of such active compound in the spray liquid is mixed with the stated amount of solvent, and the resulting concentrate is diluted with the stated amount of water which contains the stated emulsifier.

Young apple seedlings in the 4–6 leaf stage are sprayed with the spray liquid until dripping wet. The plants remain in a greenhouse for 24 hours at 20° C. and at a relative atmosphere humidity of 70%. They are then inoculated by dusting with conidia of the apple powdery mildew causative organism (*Podosphaera leucotricha* Salm.) and placed in a greenhouse at a temperature of 21–23° C. and at a relative atmospheric humidity of about 70%.

10 days after the inoculation, the infestation of the seedlings is determined as a percentage of the untreated but also inoculated control plants.

0% means no infestation; 100% means that the infestation is exactly as great as in the case of the control plants.

The active compounds, their concentrations, and the results obtained can be seen from the following Table 1:

Table 1.—PODOSPHAERA TEST (PROTECTIVE)

| Active compound | | Infestation in percent [1] | |
|---|---|---|---|
| | | 0.1% | 0.05% |
| (A) | ![phthalimide-SCCl3] (known) | 76 | 100 |
| (I) | ![phthalimide-N-CH2-S-R] | | |
| R= | | | |
| (III') | —C6H4—Cl | | 0 |
| (IV) | —C6H3(Cl)—Cl | | 83 |
| (V) | —C6H4—CH3 | | 7 |
| (VI) | —C6H5 (H) | | 57 |
| (VII) | —C2H5 | | 25 |
| (VIII) | —C6H4—SCH3 | | 78 |

[1] Of the infestation of the untreated control with a concentration of active compound of—

EXAMPLE 2

Erysiphe test

Solvent: 4.7 parts by weight acetone
Emulsifier: 0.3 part by weight alkylaryl polyglycol ether
Water: 95 parts by weight.

The amount of the particular active compound required for the desired concentration in the pray liquid is mixed with the stated amount of the solvent, and the resulting concentrate is diluted with the stated amount of water containing the stated emulsifier.

Young cucumber plants (Delikatess variety) with about three foliage leaves are sprayed with the spray liquid until dripping wet. The cucumber plants remain in a greenhouse for 24 hours to dry. They are then, for the purpose of inoculation, dusted with conidia of the fungus *Erysiphe polyphaga*. The plants are subsequently placed in a greenhouse at 23–24° C. and at a relative atmospheric humidity of about 75%.

After 12 days the infestation of the cucumber plants is determined as a percentage of the untreated but also inoculated control plants. 0% means no infestation; 100% means that the infestation is exactly as great as in the case of the control plants.

The active compounds, their concentrations, and the results obtained can be seen from the following Table 2:

TABLE 2.—ERYSIPHE TEST

| Active Compound | | Infestation in percent [1] |
|---|---|---|
| (A) | ![phthalimide-SCCl3] (known) | 100 |
| (I) | ![phthalimide-N-CH2-S-R] | ——— |
| R= | | |
| (III'') | —C6H4—Cl | 37 |
| (V') | —C6H4—CH3 | 23 |
| (VII') | —C2H5 | 30 |

[1] Of the infestation of the untreated control with a concentration of active compound of 0.1%.

The process for producing the particular new compounds of the present invention is illustrated, without limitation, by the following examples:

EXAMPLE 3

(III''') 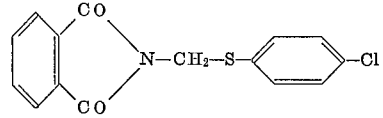

240 g. (1 mol) N-bromomethylphthalimide (M.P. 149° C.) are dissolved in 600 cc. acetonitrile. To the resulting solution there is added, at 20° C. and with stirring, a mixture consisting of 145 g. p-chlorothiophenol, 1 mol sodium methylate solution and 200 cc. acetonitrile. Stirring is effected for two hours at room temperature and the reaction product is then poured into 1000 cc. of water. The separated oil which results is taken up with 600 cc. benzene. The benzene solution is washed with water and then dried over soduim sulfate. When the benzene is distilled off, 280 g. N-phthalimidomethyl-p-chlorophenylthioether [i.e., N - (4 - chlorophenylmercaptomethyl)-phthalimide] of M.P. 102° C. are obtained. Yield: 92% of the theory.

EXAMPLE 4

(IX) 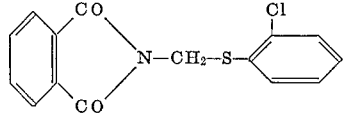

72 g. o-chlorothiophenol are dissolved in 300 cc. acetonitrile. 0.5 mol sodium methylate is then added to the resulting solution. 120 g. (0.5 mol) N-bromomethylphthalimide are thereafter added at 25° C., with stirring. Stirring is effected for two hours, followed by working up as described in Example 3. There are obtained in this manner 129 g. N-phthalimidomethyl-o-chlorophenylthioether [i.e., N - (2-chlorophenylmercaptomethyl)-phthalimide]. Yield: 85% of the theory. This new thioether melts at 104° C.

EXAMPLE 5

(IV') 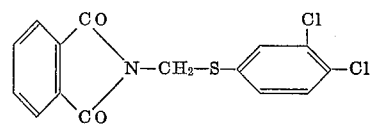

90 g. (0.5 mol) 3,4-dichlorothiophenol are dissolved in 300 cc. acetonitrile. 0.5 mol sodium methylate solution is then added thereto. 120 g. (0.5 mol) N-bromomethylphthalimide are thereafter added, with stirring. Stirring is effected for three hours, followed by working up as described in Example 3. There are obtained in this manner 92 g. N-phthalimidomethyl-3,4-dichlorophenylthioether [i.e., N - (3,4 - dichlorophenylmercaptomethyl)-phthalimide] of M.P. 127° C. Yield: 54% of the theory.

EXAMPLE 6

(X) 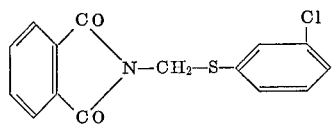

72 g. (0.5 mol) 3-chlorothiophenol are dissolved in 400 cc. acetonitrile. 0.5 mol of a sodium methylate solution is then added to the resulting solution. 120 g. N-bromomethylphthalimide are thereafter added to the reaction product, with stirring. Stirring is continued for a further two hours, followed by working up as described in Example 3. There are obtained in this manner 142 g. N-phthalimidomethyl-3-chlorophenylthioether [i.e., N-(3-chlorophenylmercaptomethyl)-phthalimide] of M.P. 98° C. Yield: 93% of the theory.

EXAMPLE 7

(V″) 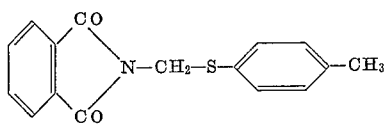

62 g. (0.5 mol) p-thiocresol are dissolved in 300 cc. acetonitrile. 0.5 mol of a sodium methylate solution is then added thereto. Thereafter 125 g. (0.5 mol) N-bromomethylphthalimide are added at 25° C., with stirring. Stirring is continued for a further 2 hours, followed by working up as described in Example 3. There are obtained in this manner 130 g. N-phthalimidomethyl-4-methylphenylthioether [i.e., N-(4-methylphenylmercaptomethyl)-phthalimide] of M.P. 96° C. Yield: 92% of the theory.

EXAMPLE 8

(VI′) 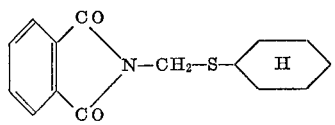

58 g. (0.5 mol) cyclohexylmercaptan are dissolved in 300 cc. acetonitrile. 0.5 mol of a sodium methylate solution is then added thereto, and thereafter 120 g. (0.5 mol) N-bromomethylphthalimide are added at 20° C., with stirring. Stirring is continued for a further three hours, followed by working up in the usual manner. There are obtained in this manner 170 g. N-phthalimidomethylcyclohexylthioether [i.e., N-(cyclohexylmercaptomethyl)-phthalimide] of M.P. 68° C. Yield: 78% of theory.

EXAMPLE 9

(VII″) 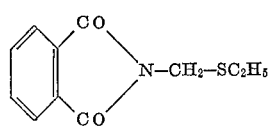

85 g. (0.5 mol) sodium ethylmercaptide are dissolved in 600 cc. acetonitrile. 120 g. (0.5 mol) N-bromomethylphthalimide are then added thereto at 20° C., with stirring. Stirring is continued for a further 2 hours, followed by working up as described in Example 3. There are obtained in this manner 90 g. N-phthalimidomethyl-thioethylether [i.e., N-(ethylmercaptomethyl)-phthalimide] of M.P. 82° C. Yield: 82% of the theory.

EXAMPLE 10

(XI) 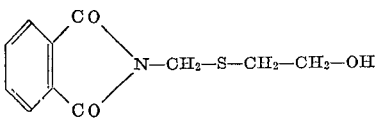

39 g. (0.5 mol) hydroxyethylmercaptan are combined with 0.5 mol of a sodium methylate solution. 300 cc. of acetonitrile are then added to the resulting solution. 120 g. N-bromomethylphthalimide are thereafter stirred in at 20° C. Stirring is continued for a further 3 hours at room temperature, followed by working up as in Example 3. There are obtained in this manner 98 g. N-phthalimidomethyl-(2-hydroxyethyl)-thioether [i.e., N - (2-hydroxyethylmercaptomethyl)-phthalimide] of M.P. 73° C. Yield: 83% of the theory.

EXAMPLE 11

(VIII′) 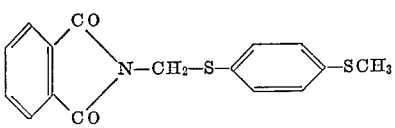

78 g. (0.5 mol) p-methylmercaptothiophenol are dissolved in 300 cc. acetonitrile. 0.5 mol of a sodium methylate solution are then added thereto. 120 g. N-bromomethylphthalimide are thereafter stirred in at 30° C. Stirring is effected for two hours, followed by working up as in Example 3. There are obtained in this manner 135 g. N-phthalimidomethyl - (4 - methylmercaptophenyl)-thioether [i.e., N-(4 - methylmercaptophenylmercaptomethyl)-phthalimide] of M.P. 144° C. Yield: 86% of the theory.

EXAMPLE 12

In the same way, in accordance with the procedure of Example 3, using corresponding molar amounts of N-bromomethylphthalimide and the following starting materials:

(a) thiophenol;
(b) 3-ethoxy-5-hydroxy-thiophenol;
(c) thionaphth-1-ol;
(d) 3-chloro-6-bromo-thionaphth-1-ol;
(e) cyclopent-3-enylmercaptan;
(f) 4-tert.-butylcyclohexylmercaptan;
(g) 2-hydroxy-4-n-propyl-6-iodo-cyclohexylmercaptan;
(h) potassium methylmercaptide;
(i) tert.-butylmercaptan;
(j) sodium-γ-allylmercaptide;
(k) acetylenylmercaptan;
(l) but-2-enylcercaptan;
(m) 2-hydroxy-3-fluoro-4-chloro-n-butylmercaptan;
(n) 2-ethoxy-ethylmercaptan; and
(o) 2-chloro-3-methylmercapto-n-prop-2-enylmercaptan;

the corresponding final products are obtained:

(a′) N-(penylmercaptomethyl)-phthalimide;
(b′) N-(3-ethoxy-5-hydroxy-phenylmercaptomethyl)-phthalimide;
(c′) N-(naphth-1-ylmercaptomethyl)-phthalimide;
(d′)-N-(3-chloro-6-bromonaphth-1-ylmercaptomethyl)-phthalimide;
(e′) N-(cyclopent-3-enylmercaptomethyl)-phthalimide;
(f′) N-(4-tert.-butylcyclohexylmercaptomethyl)-phthalimide;
(g′) N-(2-hydroxy-4-n-propyl-6-iodo-cyclohexylmercaptomethyl)-phthalimide;
(h′) N-(methylmercaptomethyl)-phthalimide;
(i′) N-(tert.-butylmercaptomethyl)-phthalimide;
(j′) N-γ-allylmercaptomethyl)-phthalimide;
(k′) N-(acetylenylmercaptomethyl)-phthalimide;
(l′) N-(but-2-enylmercaptomethyl)-phthalimide;
(m′) N-(2-hydroxy-3-fluoro-4-chloro-n-butylmercaptomethyl)-phthalimide;

(n') N-(2-ethoxy-ethylmercaptomethyl)-phthalimide; and
(o') N-(2-chloro-3-methylmercapto-n-prop-2-enylmercaptomethyl)-phthalimide.

Advantageously, in accordance with the present invention, in the foregoing formulae:

R represents aromatic having 6–10 ring carbon atoms, including mono- and di-nuclear $C_{6-10}$ aromatic, such as phenyl, naphthyl, and the like, especially $C_{6-10}$ aryl; cycloaliphatic having 5–8 ring carbon atoms, such as cyclopentyl, hexyl, heptyl, octyl, pentenyl, and the like, especially $C_{5-8}$, preferably $C_{5-6}$, cycloalkyl, cycloalkenyl, and the like; lower aliphatic including lower alkyl, such as methyl, ethyl, n-propyl, isopropyl, n-butyl, isobutyl, sec.-butyl, tert.-butyl, and the like, especially alkyl having 1–4 carbon atoms, or lower alkenyl, such as vinyl, α-, β- and γ-allyl, but-1-enyl, but-2-enyl, but-3-enyl, and the like, especially alkenyl having 2–4 carbon atoms, or lower alkynyl, such as acetylenyl, propynyl, butynyl, and the like, especially alkynyl having 2–4 carbon atoms; and such aromatic, cycloaliphatic and aliphatic which are mono, di, poly and mixed substituted with halo such as chloro, bromo, iodo and/or fluoro, especially chloro and/or bromo, lower alkyl such as methyl to tert.-butyl inclusive, and the like, as noted above, especially $C_{1-4}$, preferably $C_{1-3}$, alkyl, lower alkoxy such as methoxy, ethoxy, n-propoxy, isopropoxy, n-butoxy, isobutoxy, sec.-butoxy, tert.-butoxy, and the like, especially $C_{1-4}$, preferably $C_{1-3}$, alkoxy, lower alkyl mercapto such as methyl-, ethyl-, n-propyl-, isopropyl-, n-butyl-, isobutyl-, sec.-butyl- and tert.-butyl- mercapto, and especially $C_{1-4}$, preferably $C_{1-3}$, alkylmercapto, and hydroxy.

All of the foregoing compounds in accordance with the present invention possess the desired strong fungicidal properties, with regard to a broad spectrum of activity, enabling such compounds with a concomitant low toxicity toward warm-blooded creatures and corresponding favorable campatibility with plants to be used more effectively to control and/or eliminate fungi by application of such compounds to the fungi and/or their habitat.

It will be appreciated that the instant specification and examples are set forth by way of illustration and not limitation, and that various modifications and changes may be made without departing from the spirit and scope of the present invention.

What is claimed is:

1. N-substituted-phthalimide having the formula

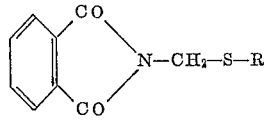

in which R is selected from the group consisting of, $C_{5-6}$ cycloalkyl and hydroxy- $C_{1-4}$ alkyl.

2. N-substituted-phthalimide having the formula

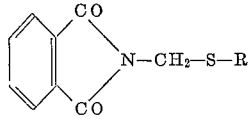

wherein R is $C_{5-6}$ cycloalkyl.

3. N-substituted-phthalimide having the formula

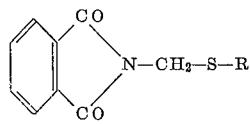

wherein R is hydroxy $C_{1-4}$ alkyl.

4. Phthalimide according to claim 1 wherein such compound is N-(cyclohexylmercaptomethyl)-phthalimide having the formula

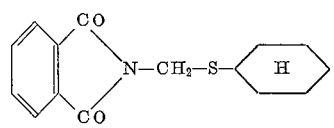

5. Phthalimide according to claim 1 wherein such compound is N-(2-hydroxyethylmercaptomethyl)-phthalimide having the formula

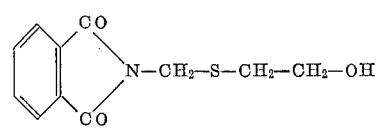

References Cited

Sunthankar et al.: Chem. Abs., 49: 8176 (1955).
Kiss et al.: Chem. Abs., 44: 5706 (1950).
Ponci et al.: Chem. Abs., 61: 8217–18 (1964).
Novelli et al.: Chem. Abs., 39: 1409 (1945).
Karrer et al.: Chem. Abs., 45: 2426 (1951).
Vinkler et al.: Chem. Abs., 52: 3767 (1958).
Chem. Abs.-Index, 52: 2057–58 (1958).
Lo: J. Org. Chem. (1961), 26: 3591–93.

ALEX MAZEL, Primary Examiner

J. A. NARCAVAGE, Assistant Examiner

U.S. Cl. X.R.

424—274